(12) United States Patent
Reiter et al.

(10) Patent No.: US 6,478,176 B1
(45) Date of Patent: Nov. 12, 2002

(54) MOLDED CONTAINER ASSEMBLY FOR TRANSPORTING BULK MATERIAL

(76) Inventors: William P. Reiter, 1435-13th Street W., Dickinson, ND (US) 58601; Thomas Knutson, Rt. 3, Box 112A, Dickinson, ND (US) 58601; Dean Kovash, HC1 Box 93, Manning, ND (US) 58642

( * ) Notice: Subject to any disclaimer, the term of this patent is extended or adjusted under 35 U.S.C. 154(b) by 0 days.

(21) Appl. No.: 09/535,284

(22) Filed: Mar. 24, 2000

Related U.S. Application Data

(63) Continuation of application No. 08/764,852, filed on Dec. 13, 1996, now Pat. No. 6,076,693.

(51) Int. Cl.[7] .............................................. B65D 88/12
(52) U.S. Cl. ..................................... 220/1.6; 220/23.87
(58) Field of Search ......................... 220/995.01, 23.87, 220/23.91, 23.89, 1.6, 9.1; 296/184, 39.2, 181

(56) References Cited

U.S. PATENT DOCUMENTS

| | | | |
|---|---|---|---|
| 3,001,814 A | 9/1961 | Skalko | |
| 3,334,007 A | 8/1967 | Flagan | |
| 3,480,321 A | 11/1969 | Brandt et al. | |
| 3,578,375 A | 5/1971 | Finefrock | |
| 3,653,710 A | * 4/1972 | Barnard | 296/39.1 |
| 3,712,675 A | 1/1973 | Schoenwald | |
| 3,827,753 A | 8/1974 | Pitts | |
| 4,029,354 A | 6/1977 | Valeri | |
| 4,817,824 A | * 4/1989 | LaFleur et a. | 222/105 |
| 4,909,559 A | 3/1990 | Zettle | |
| 4,991,899 A | 2/1991 | Scott | |
| 5,007,671 A | 4/1991 | Oprea | |
| 5,076,636 A | 12/1991 | Buck et al. | |
| 5,154,463 A | 10/1992 | Hershey | |
| 5,186,351 A | * 2/1993 | Gallo et al. | 220/563 |
| 5,221,119 A | * 6/1993 | Emery | 296/39.2 |
| 5,265,993 A | 11/1993 | Wayne | |
| 5,313,907 A | 5/1994 | Hodges | |
| 5,316,701 A | 5/1994 | Payne | |
| 5,360,250 A | * 11/1994 | Wood et al. | 296/39.2 |
| 5,435,627 A | 7/1995 | Fleming | |
| 5,447,361 A | * 9/1995 | Phillips | |
| 5,482,356 A | 1/1996 | Goodson, Jr. | |
| 5,704,477 A | * 1/1998 | Hermann et al. | 206/386 |
| 6,076,693 A | 6/2000 | Reiter et al. | |

OTHER PUBLICATIONS

Phillips, "Plastic Growth in Autos Steadies", *Recycling Today* 40–42, 44–45, 129–130 (1996).
"Watertight PolyBox/Poly Tank", WasteCo Manufacturing, Brochure, 2 pgs.
"Workhorse Load Lifter", Workhorse Inc., 711 NE 332nd Court, Washougal, WA 98671, Brochure, dated Mar. 22, 2001. (3 pgs.).

* cited by examiner

*Primary Examiner*—Stephen Castellano
(74) *Attorney, Agent, or Firm*—Mueting, Raasch & Gebhardt, P.A.

(57) ABSTRACT

A container assembly for transporting bulk materials that includes a molded, one-piece completely integral non-metallic container insert and a frame supporting the container insert. The container insert can be molded of polyolefin. It can include walls having varying thicknesses, a bottom wall having a thickness greater than the side walls, and/or reinforcing structures molded within the walls. The container assembly can be constructed to provide a fixed truck box or dump truck box.

16 Claims, 6 Drawing Sheets

MOLDED CONTAINER ASSEMBLY FOR TRANSPORTING BULK MATERIAL

RELATED APPLICATIONS

This is a continuation of U.S. patent application Ser. No. 08/764,852 filed on Dec. 13, 1996, now U.S. Pat. No. 6,076,693, which is incorporated herein by reference in its entirety.

FIELD OF THE INVENTION

The present invention relates to the field of shipping and trucking containers. More particularly, the present invention includes a container assembly including a molded, one-piece, completely integral non-metallic container insert and frame.

BACKGROUND OF THE INVENTION

A wide variety of containers are used to transport bulk materials. Typically, containers for transporting bulk materials are constructed of sheet metal either fashioned into a tank or an open container such as a fixed truck box, pivoting dump truck box, or roll-off container. As used in connection with the present invention, "containers" includes open containers such as pivoting dump truck boxes, fixed truck boxes, roll-off containers detachable from a truck, intermodal containers designed to be transported by ship, train or truck, substantially enclosed tanks for use in transporting bulk liquids, and any other container assembly for transporting bulk materials that is adapted to be attached to a truck, truck-like vehicle, or trailer. Containers within the meaning of that term as used in connection with the present invention are designed to transport bulk materials in loads ranging from one-half ton or more. The materials can include soil, rocks, grains, foods, liquids, etc.

The containers are typically manufactured using sheet metal (typically steel) attached to a framework of structural members. Sheet metal is used to manufacture the boxes because of its strength and resistance to wear—both properties that are required during typical use of the trucks. In spite of the durability and toughness provided by the sheet metal boxes, there are drawbacks associated with metal truck boxes and other containers.

One problem is that the truck boxes and other containers manufactured with sheet metals are themselves typically relatively heavy which limits the loads that can be transported by the trucks. Furthermore, the sheet metal used to manufacture the truck boxes and containers typically corrodes easily, reducing the useful life of the containers. In addition, it may not be desirable or allowable to allow some materials to come into contact with the sheet metal, thereby requiring the use of expensive liners or other methods to prevent contact between the materials and the sheet metal.

Furthermore, the sheet metal can make unloading difficult in some situations. For example, in colder climates moisture in the materials may cause them to freeze to the interior of the container, typically requiring hand labor to dislodge the material. In some situations, the entire container may need to be heated to facilitate unloading and/or pressurized water may be required to completely unload the container. All of these actions raise the cost of transporting materials using conventional containers manufactured from sheet metal.

In addition to freezing, friction between the materials and the sheet metals used in the containers can also make unloading difficult, requiring the operator, in some situations, to rapidly accelerate and decelerate the containers (which may be mounted to pivot about the end of the truck) in an attempt to jar the materials loose. Such actions add unnecessary stress and wear to the containers as well as the hydraulic lifts used to pivot them, adding the cost to repair any damage and potentially reducing the useful life of the containers and/or hydraulic lifts.

In addition to causing difficulty in unloading when the load remains in the container, such situations may also result in personal injury or damage to the truck because the probability of, for example, a dump truck tipping over is greatly increased when its box is raised to dump a load of material. The probability of tipping is increased because the load typically stays in the front end of the box (which is raised the highest). The raised load may raise the center of gravity of the truck above a point at which the truck is stable, particularly in locations, such as construction sites, where the ground is uneven or unstable.

To address the issue of friction between the load and truck box, some users may coat the interior of the truck box with a release agent, such as diesel fuel, that assist in removal of the load during dumping. That practice can cause undesirable environmental contamination as the materials unloaded from the container invariably carry with them some of the diesel fuel or other release agent.

SUMMARY OF THE INVENTION

The present invention provides a container assembly for transporting bulk materials that includes a molded, one-piece completely integral non-metallic container insert and a frame supporting the container insert. The advantages provided by the invention include reduced weight as compared to container assemblies manufactured with sheet steel, reduced corrosion, improved release properties, and the ability to easily replace a worn container insert while retaining the supporting frame.

In one aspect, the present invention comprises a container assembly for transporting bulk materials including a substantially rigid frame formed of spaced-apart members; and a molded, one-piece, completely integral non-metallic container insert having at least one wall with an exterior surface, the container insert located substantially within the frame, the exterior surface including a retaining structure for attaching the container insert to the frame, wherein the retaining structure is molded integral with the exterior surface of the container insert.

The container insert is preferably molded of a non-metallic material, such as a polyolefin. It can include walls having varying thicknesses, a bottom wall having a thickness greater than the side walls, and/or reinforcing structures molded within the walls. The container assembly can be constructed to provide a substantially enclosed tank, a roll-off container, intermodal container, a fixed truck box, or a dump truck box.

In another aspect, the present invention comprises a truck box for transporting bulk materials, the truck box including a substantially rigid frame formed of spaced-apart members; and a molded, one-piece, completely integral nonmetallic container insert having at least one wall with an exterior surface, the container insert located substantially within the frame, the exterior surface including a retaining structure for attaching the container insert to the frame, wherein the retaining structure is molded integral with the exterior surface of the container insert.

These and other various features and advantages of the present invention are described in more detail below.

DETAILED DESCRIPTION OF THE INVENTION

Figure 1:
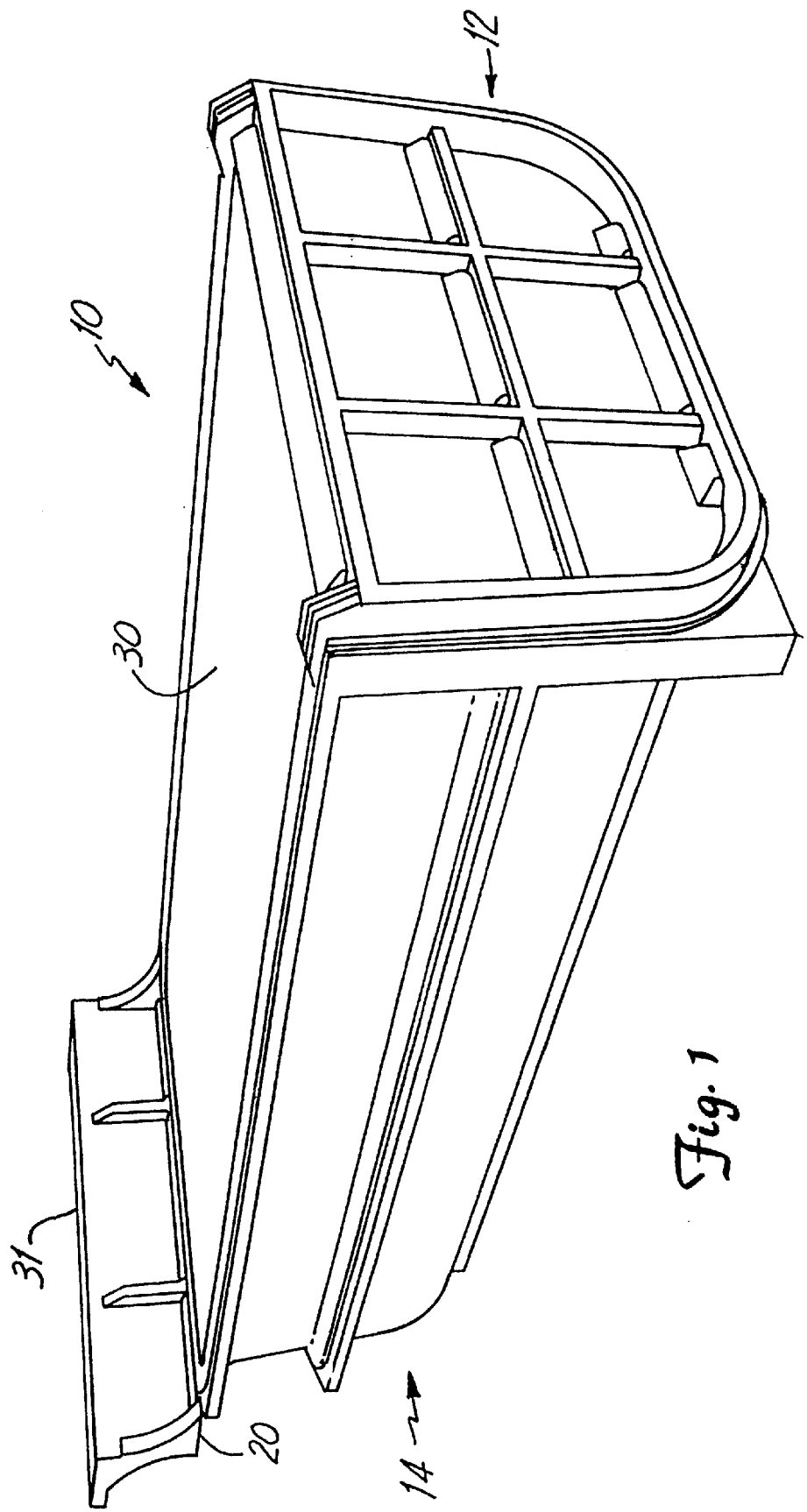
FIG. 1 is a perspective view of one container assembly according to the present invention.

The present invention provides a container assembly incorporating a non-metallic container insert supported within a frame having spaced-apart members. FIG. 1 is a perspective view of one container assembly 10 according to the present invention including a frame 20 and a non-metallic container insert 30. The container assembly 10 is adapted for attachment to a vehicle (not shown), typically a truck such as a dump truck or fixed bed truck (including a pickup truck), so that it can be transported with a load of material located within the container insert 30. In many instances, the container assembly 10 will be mounted for pivotal movement about its back end 12 such that materials located in the container insert 30 can be removed by raising the front end 14 of the container assembly 10 relative to the back end 12.

Figure 2:
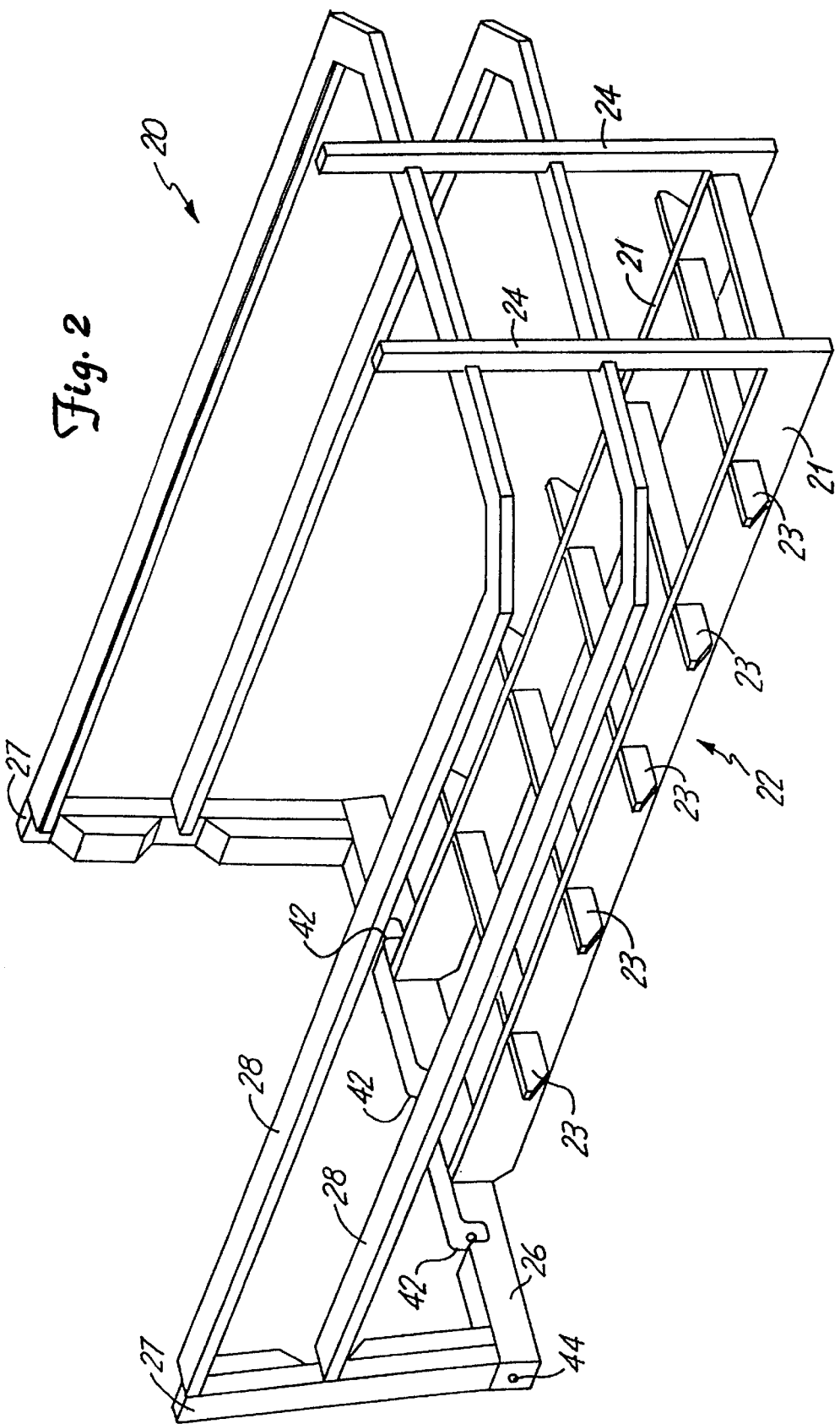
FIG. 2 is a perspective view of the frame used in the assembly of FIG. 1.
Figure 3:
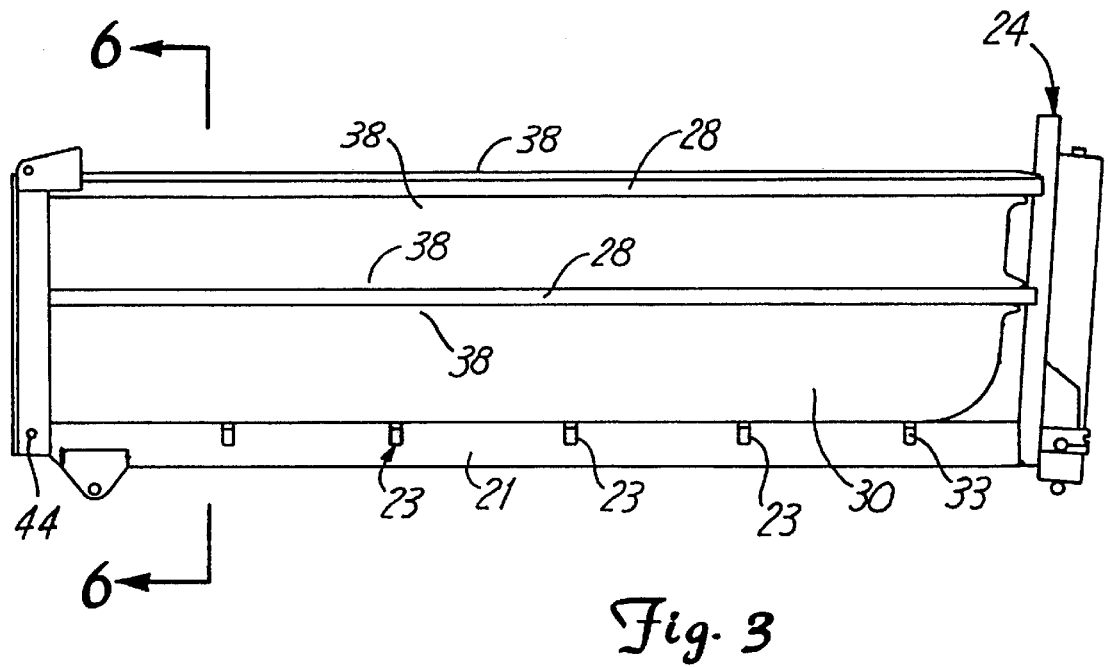
FIG. 3 is a side view of the container assembly of FIG. 1.
Figure 4:
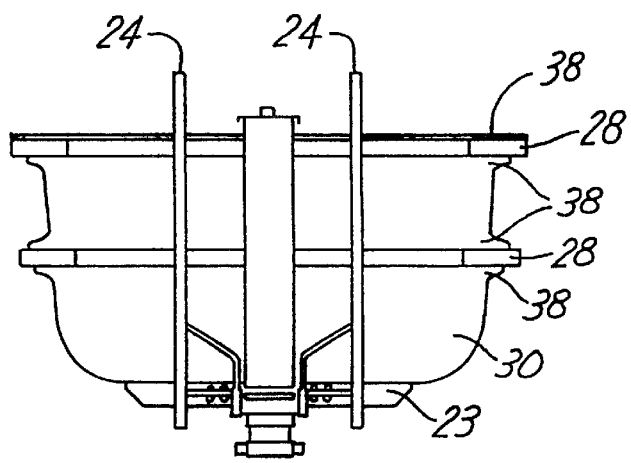
FIG. 4 is a front end view of the container assembly of FIG. 1.

Referring now to FIGS. 2–4, the frame 20 includes a bottom 22 formed from spaced-apart longitudinally extending members 21. A series of transverse bottom frame members 23 are provided to support the container insert 30 as well as to maintain the spacing between members 21. At the front end, the longitudinally extending members 21 are attached to a pair of front upright members 24. At the rear end, the longitudinally extending members 21 are attached to a rear frame bottom member 26. The rear frame bottom member 26 supports a pair of rear upright members 27. The rear upright members 27 and front upright members 24 are attached to side supports 28 that extend along both sides and around the front end 14 of the container assembly 10.

It is preferred that the frame 20 be constructed of substantially rigid materials such as structural steel, although any other suitable materials could be provided. The exact dimensions of the members and their arrangement will be based on the intended use of the container assembly 10. It should be understood that the although a specific embodiment of the frame 20 is depicted in the figures, any suitable frame construction incorporating spaced-apart frame members designed to support a non-metallic container insert 30 could be provided in connection with the present invention.

An important feature of the invention is that the frame 20 is constructed of spaced-apart members adapted to support and enclose the non-metallic container insert 30 such that it retains its shape when loaded with a bulk material. As a result, the spaced-apart frame members of the frame 20 will typically define a volume within which the container insert 30 is located and supported. By providing that combination, a container assembly 10 according to the present invention offers a relatively light weight assembly for transporting bulk materials that is still structurally sound.

Figure 5:
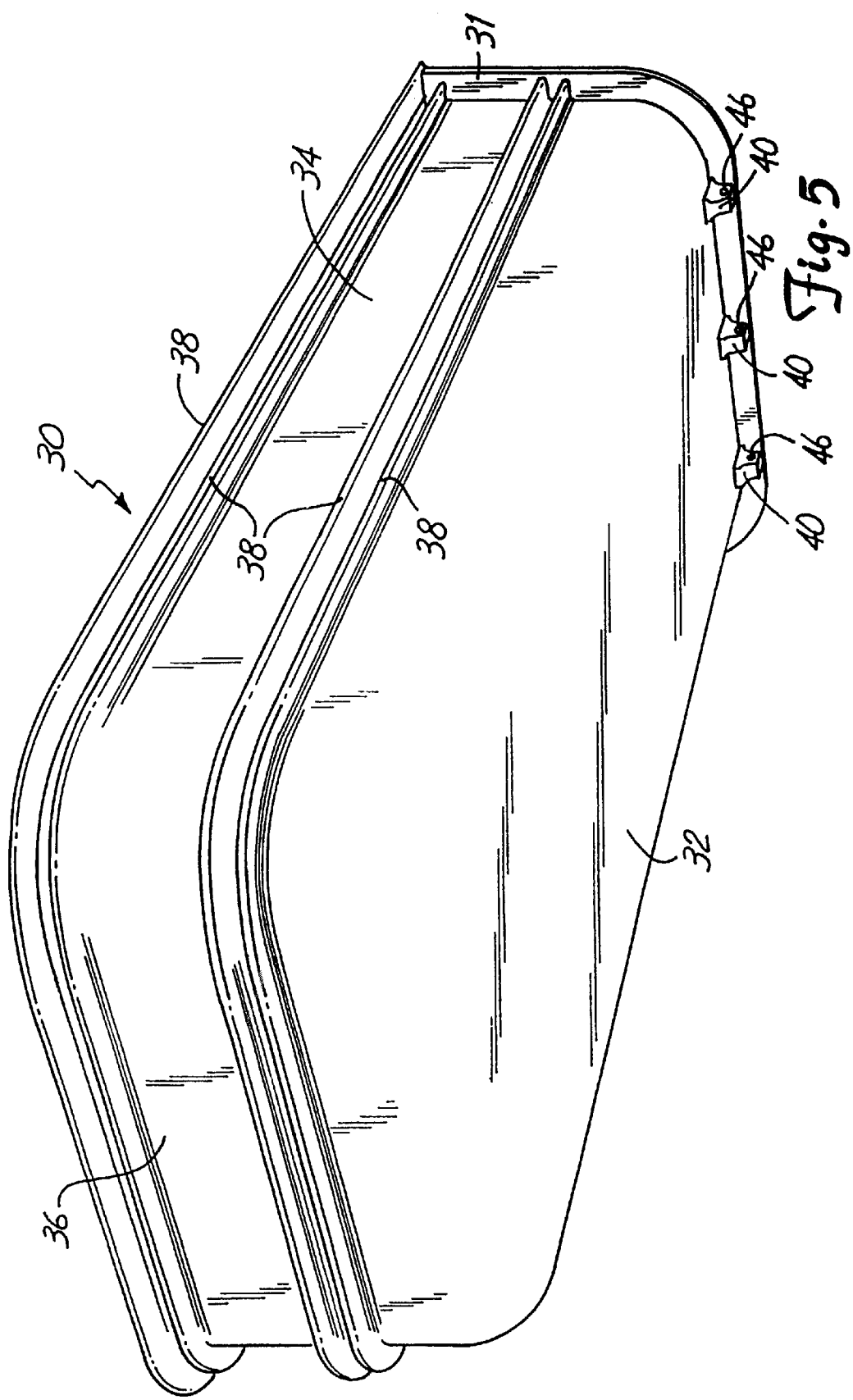
FIG. 5 is a perspective view of the container insert used in the assembly of FIG. 1.

FIG. 5 depicts the container insert 30 removed from the frame 20 of the container assembly 10. The container insert 30 is constructed from non-metallic materials that provide the required strength (when supported in frame 20) to transport the desired loads. Among suitable non-metallic materials for the container insert 30 are polyolefins (including blends thereof). One particularly preferred material for container insert 30 is high density polyethylene (HDPE) because of its rigidity, strength, chemical resistance, and high-release, low-friction surface properties. It will be understood that any non-metallic material having the properties necessary to form a container insert 30 in a container assembly 10 according to the present invention could be substituted for the preferred materials. Furthermore, although the entire container insert 30 of the preferred embodiment is formed of HDPE, it may be possible to provide different portions of the container insert 30 of different materials. It may also be desirable to provide container inserts having walls constructed of layers of different materials to enhance strength, abrasion resistance, impact resistance, etc. In additional, it will also be understood that additional components may be included in the materials, such as UV stabilizers, release agents, etc.

The container insert 30 includes a bottom wall 32, opposing side walls 34 and a front wall 36. The rear of the container insert 30 preferably includes a flange 31 adapted to butt against the rear of the frame 20. Opposing pairs of raised ribs or flanges 38 are also provided on the exterior surfaces of the side walls 34 and the front wall 36. Each opposing pair of flanges 38 defines a slot within which one of the side supports 28 can be located to assist in supporting the container insert 30 as well as assist in retaining the container insert 30 in the frame 20.

Figure 6:
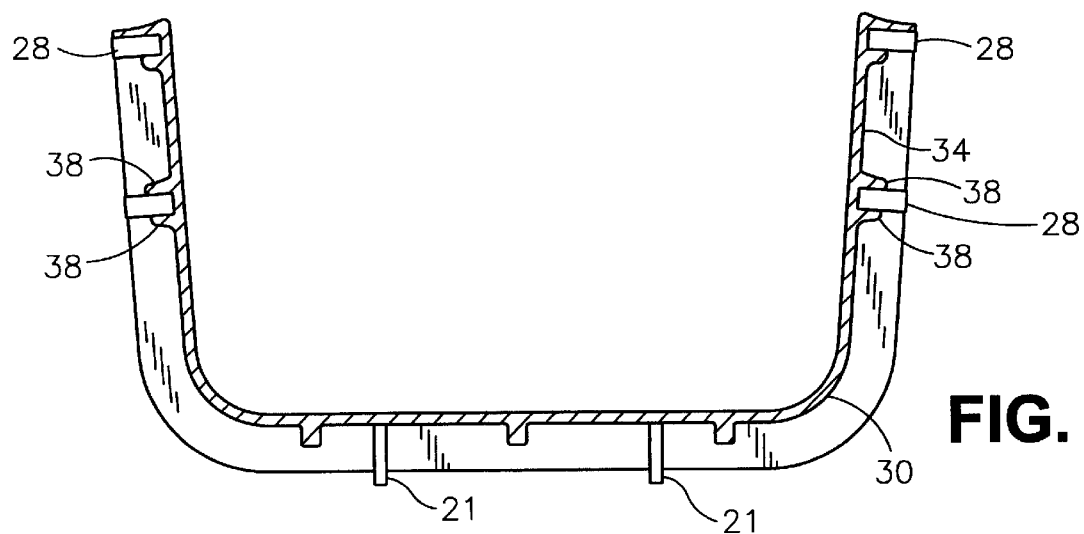
FIG. 6 is a cross-sectional view along line 6—6 of the container assembly as shown in FIG. 4.

The relationship between the flanges 38 and side supports 28 can be best seen in the cross-sectional view of FIG. 6 (taken along line 6—6 in FIG. 3). As shown, the slots defined by each pair of flanges 38 at least partially receives a side support 28. It is preferred that the slots defined by the flanges 38 and side supports 28 have complementary shapes as shown to assist in their ability to cooperate to retain the container insert 30 within frame 20. They may also include other attachment means such as mechanical fasteners, etc. It is however, preferred that any such methods of attachment provide for movement of the container insert 30 relative to the frame 20 due to thermal expansion/contraction.

FIG. 6, along with FIG. 2, depict one preferred retaining structure 40 located near the rear of the container insert 30. The retainers 40 are essentially eyelets that fit within cooperating slots 42 in the rear frame bottom member 26 (see FIG. 2). Openings 44 (see FIGS. 2 and 3) provided in the rear frame bottom member 26 align with openings 46 (see FIG. 5) in the retainers 40 to allow for the insertion of a pin or rod 48 through member 26 and retainers 40 to retain the container insert 30 within frame 20.

It is helpful to attach the container insert 30 to the frame 20 at a single point (or along a single axis transverse to the longitudinal axis of the container assembly 10) due allow the container insert 30 to expand and contract in response to temperature variations without inducing stresses due to the differential expansion rates of the frame 20 and the container insert 30. Although one mechanism for attaching the container insert 30 is depicted, it will be understood that many other mechanisms could be provided to accomplish the same result.

The container insert 30 is preferably a molded, one-piece, completely integral object to avoid introducing areas of weakness or stress concentrations from attaching components to the container insert 30 through welding, adhesives, mechanical fasteners, etc. It should be understood, however, that additional minor components could be attached after molding, but they are preferably not structurally integral with the container insert 30. One example of a component that may be added to the container insert 30 is the cab protector 31 best seen in FIG. 1. The protector can be attached to the upper edge of the container insert 30 by any suitable means, including, but not limited to: welding, adhesives, mechanical fasteners, etc.

To provide a molded one-piece, completely integral container insert 30, it is advantageous to employ a rotational molding process. One such process is described in U.S. Pat. No. 5,316,701 to Payne. Rotational molding services are provided by a number of companies, including Snyder-Crown Industries, Lincoln, Nebr., as well as Assmann Corporation, Garrett, Ind. Other molding methods could also be used including compression, injection, etc. Regardless of the molding process used, it is preferable to mold the structures used to retain the container insert 30 within the frame 20, such as flanges 38 and retainers 40, integrally with the remainder of the container insert 30 to reduce any potential problems associated with welding or other means of attaching such structures to the container insert 30.

One advantage of molding the container insert 30 as a one-piece integral unit is that the corners, i.e., the junction between the bottom 32, side walls 34 and front wall 36 can be provided in a smoothly rounded shape as seen in, for example, FIG. 5. Those smoothly rounded corners help reduce the incidence of materials gathering and remaining in the container insert 30 after unloading. That problem is particularly acute when the materials being transported have high moisture contents, such as grains, etc.

It is also desirable to provide the container insert 30 with varying wall thicknesses to enhance the weight and strength advantages of the container assembly 10 according to the resent invention over conventional container assemblies. It is preferred that any variations in wall thickness are gradual, i.e., not step-wise or discrete, to avoid inducing any areas of stress concentration in the walls. The use of varying wall thicknesses in a molded, one-piece, completely integral container 30 provides enhanced strength, impact resistance, and ability to endure wear without premature failure that could not be provided if the container insert 30 was, for example, constructed of various pieces of material attached together through welding.

It will typically be desirable to provide thicker walls in the bottom of the container insert 30 as well as at the junction between the bottom wall 32 and the side walls 34 and front wall 36. Those areas will typically be subjected to the greatest wear and impacts as the container assembly 10 is loaded and unloaded. For example, if HDPE is used to form the container insert 30 for a container assembly designed for a dump truck, the side walls 34 and front wall 36 could be provided with a thickness of about ⅝ inches (15.9 mm) while the areas such as the radius between the bottom wall 32 and side walls 34 or front wall 36 as well as the bottom wall 32 could be thicker, i.e., about 1 inch (25.4 mm), to withstand the increased forces and wear likely to be encountered in those areas. Alternatively, the container insert 30 could be provided with more localized areas where the wall thickness is increased, such as where fittings or other components may be attached to the insert 30 after molding.

Figure 7:
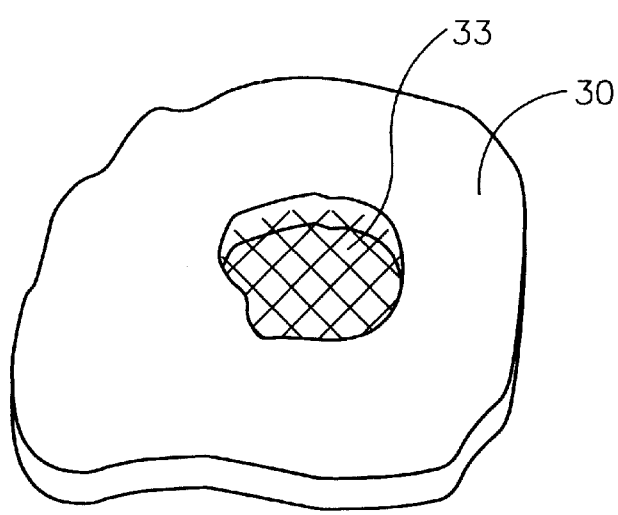
FIG. 7 is a partial cut-away view of a portion of one container insert according to the present invention.

In addition to providing varying wall thicknesses in the areas of wear, it may also be desirable to provide reinforcing structures in the material such that the wall thickness can be further reduced without excessively reducing the strength of the walls. Examples of potential reinforcing structures that could be included within the bulk of the material of the container insert 30 include fibers, netting, meshes, etc., or a combination of the above. FIG. 7 depicts a partial cut-away view of a portion of a container insert 30 including a reinforcing mesh structure 33. The reinforcing structures could be constructed of any suitable materials, although one particularly material is KEVLAR™, available from E. I. DuPont de Nemours, Wilmington, Del. The reinforcing structures may also be provided in only selected areas where severe impacts are to be expected, or throughout the container insert 30.

Figure 8:
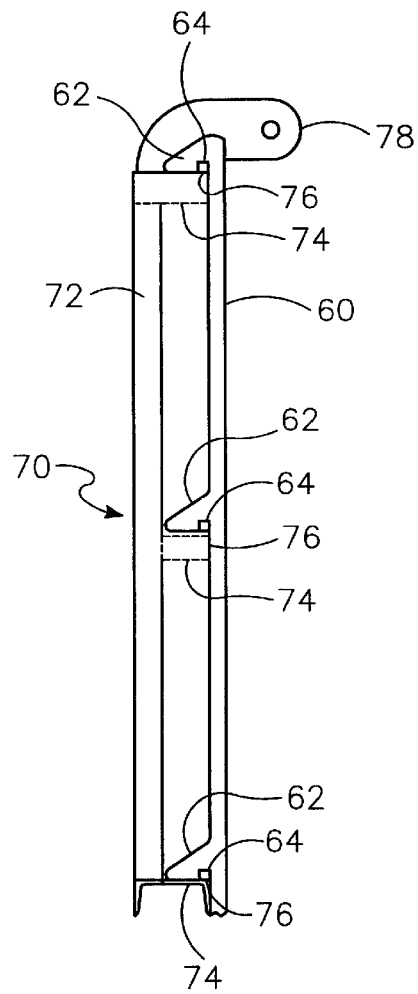
FIG. 8 is a cross-sectional view of one door assembly useful in connection with the container assembly shown in FIG. 1.

The container assembly 10 may also include a door assembly 50 at the rear end to retain materials within the container insert 30 during transport as seen in FIG. 1. A conventional pivoting door may be used in connection with the container assembly 10 according to the present invention or, optionally, a door assembly 50 including a non-metallic door panel 60 on a frame 70 could be provided, one embodiment of which is depicted in FIG. 8.

As with the container insert 30, the door panel 60 is also preferably molded as a one-piece, completely integral object. The materials described above for the container insert 30 would also preferably be used for the door panel 60. FIG. 8 is a cross-sectional view of the door assembly 50 including vertical members 72 and cross-members 74. The cross-members 74 preferably include flanges 76 adapted to fit within slots 64 formed in flanges 62 on door panel 60 as shown. The upper end of the outside vertical members preferably include hinge plates 78 for hingedly attaching the door assembly 50 to the container assembly 10. Alternatively, the door assembly 50 could rotate about a side of the container assembly 10 or about the bottom edge of the container insert 30.

Figure 9:
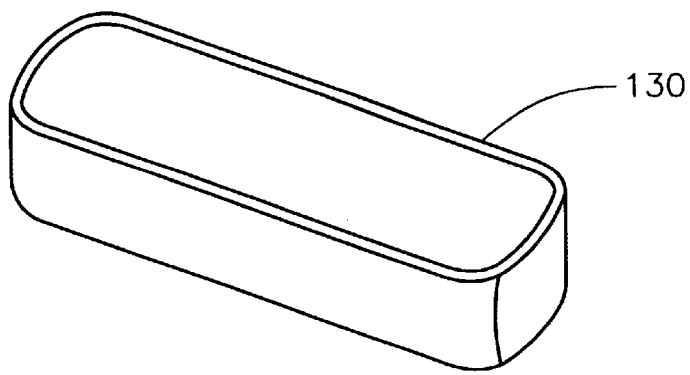
FIG. 9 is a perspective view of an alternative container insert for a container assembly according to the present invention.

Such a door assembly may not be required where the container insert is provided with a rear wall provided as a part of the molded, one-piece, completely integral container insert. One such design is depicted in FIG. 9 where the rear wall 135 is formed as part of the container insert 130. A container 130 as depicted in FIG. 9 may be useful for use in connection with side-dumping trucks or trailers. Alternatively, the container insert 130 may also be provided with a top wall to provide a substantially enclosed volume for use in connection with an intermodal shipping container.

Figure 10:
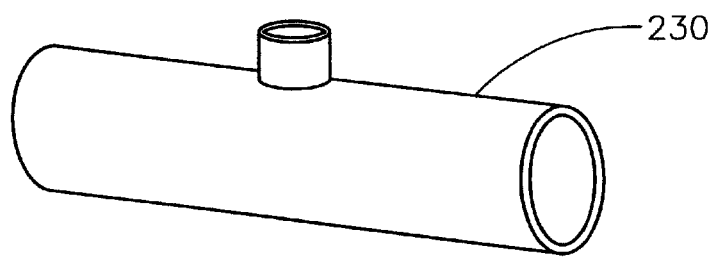
FIG. 10 is a perspective view of another alternative container insert for a container assembly according to the present invention.

Another alternative is depicted in FIG. 10, where the container insert 230 is formed as a molded, one-piece completely integral object that substantially encloses a volume to provide a tank. In such a design, it may be desirable to increase the wall thickness in localized areas where fittings are to be attached to the insert 230 to increase its strength. It may also be desirable to include baffles in the tank to reduce movement of the liquids during transport. It will also be understood that it may be desirable to provide such a tank in a food-grade material suitable for transporting, for example, drinking water, milk or other liquid food products.

Although various features and advantages of the present invention have been described herein, it will be understood that variations and substitutions can be made which do not fall outside the scope of the invention as defined by the claims appended hereto.

What is claimed is:

1. A truck box comprising:
   an open support frame formed of spaced-apart frame members; and
   a non-metallic container insert located substantially within the support frame, and further wherein the container insert comprises at least a front wall, a bottom wall, and opposing side walls that are provided as a molded, one-piece, completely integral unit, and further wherein the container insert comprises at least one eyelet on an exterior surface of the bottom wall of the container insert.

2. A truck box according to claim 1, wherein the bottom wall is thicker than at least a portion of at least one of the opposing side walls.

3. A truck box according to claim 1, wherein at least one of the opposing side walls of the container insert has a varying thickness.

4. A truck box according to claim 1, wherein the eyelet is located proximate a rear of the container insert.

5. A truck box according to claim 1, further comprising at least one flange located on an exterior surface of at least one of the side walls of the container insert, wherein the at least one flange extends generally longitudinally along a longitudinal axis of the container insert, and further wherein the at least one flange rests on one of the spaced-apart frame members of the support frame.

6. A truck box comprising:
   an open support frame formed of spaced-apart frame members;
   a non-metallic container insert located substantially within the support frame, and further wherein the container insert comprises at least a front wall, a bottom wall, and opposing side walls that are provided as a molded, one-piece, completely integral unit; and
   retaining structure on an exterior surface of the container insert, wherein the retaining structure, the container insert and the support frame cooperate to retain the container insert within the support frame, wherein the retaining structure further comprises at least one eyelet on an exterior surface of the container insert.

7. A truck box according to claim 6, wherein the retaining structure is located along a single axis transverse to the longitudinal axis of the container insert, wherein the container insert can expand and contract along the longitudinal axis independent of the support frame.

8. An apparatus for transporting bulk materials, the apparatus comprising:
   an open support frame formed of spaced-apart frame members;
   a non-metallic container insert located substantially within the support frame, and further wherein the container insert comprises at least a front wall, a bottom wall, and opposing side walls that are provided as a molded, one-piece, completely integral unit; and
   retaining structure on an exterior surface of the container insert, wherein the retaining structure, the container insert and the support frame cooperate to retain the container insert within the support frame, wherein the retaining structure further comprises at least one eyelet on an exterior surface of the container insert.

9. An apparatus according to claim 8, further comprising at least one flange located on an exterior surface of at least one of the side walls of the container insert, wherein the at least one flange extends generally longitudinally along a longitudinal axis of the container insert, and further wherein the at least one flange rests on one of the spaced-apart frame members of the support frame.

10. An apparatus according to claim 8, wherein the retaining structure is molded integral with the exterior surface of the container insert.

11. An apparatus according to claim 8, wherein the retaining structure is located along a single axis transverse to the longitudinal axis of the container insert, wherein the container insert can expand and contract along the longitudinal axis independent of the support frame.

12. An apparatus according to claim 8, wherein the container insert further comprises means for retaining the container insert within the frame.

13. An apparatus according to claim 8, wherein the container insert includes at least one wall of varying thickness.

14. An apparatus according to claim 8, wherein the bottom wall of the container insert has a thickness that is greater than the thickness of at least one of the opposing side walls.

15. An apparatus according to claims 8, wherein the container insert is formed of at least one polyolefin material.

16. An apparatus according to claim 8, wherein at least a portion of the container insert comprises a reinforcing structure molded therein.

* * * * *